P. H. WIEDERSUM.
Gig Saddle-Trees.
No. 128,689.
Patented July 2, 1872.
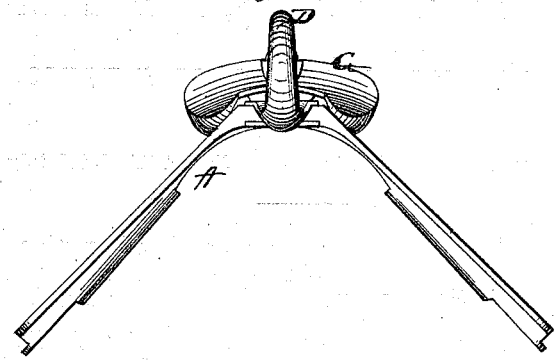
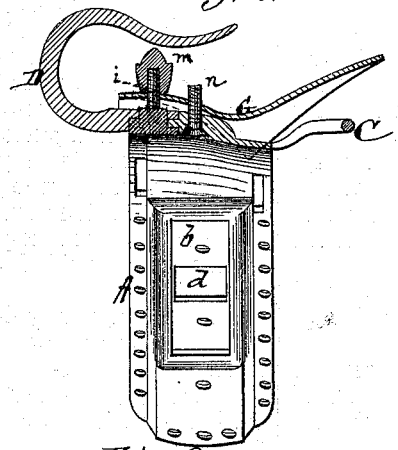
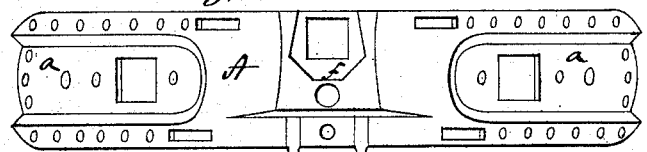
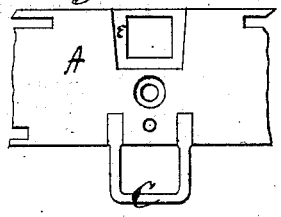
Witnesses
John A. Ellis.
C. Alexander
Inventor
Philip H. Wiedersum
Per,
J H Alexander
Atty.

128,689

UNITED STATES PATENT OFFICE.

PHILIP H. WIEDERSUM, OF NEW YORK, N. Y., ASSIGNOR TO WIEDERSUM MANUFACTURING COMPANY, OF SAME PLACE.

IMPROVEMENT IN GIG-SADDLE TREES.

Specification forming part of Letters Patent No. 128,689, dated July 2, 1872.

SPECIFICATION.

*To all whom it may concern:*

Be it known that I, PHILIP H. WIEDERSUM, of New York, in the county of New York and State of New York, have invented certain new and useful Improvements in Gig-Saddle Trees; and I do hereby declare that the following is a full, clear, and exact description thereof, reference being had to the accompanying drawing and to the letters of reference marked thereon which form a part of this specification.

The nature of my invention consists in the construction and arrangement of a saddle-tree for harness, and in the mode of fastening the saddle to the same, as will be hereinafter more fully set forth.

In order to enable others skilled in the art to which my invention appertains to make and use the same, I will now proceed to describe its construction and operation, referring to the annexed drawing, in which—

Figure 1 is a front view; Fig. 2, a vertical cross-section; Fig. 3, a plan view; and Fig. 4, a bottom view.

A represents the saddle-tree for harness, the ends of which are formed with a longitudinal depression, $a$, and on the under side thereof is a rectangular recess, $b$, with square hole $d$ in the center to receive the plate and square nut, through which the terret-screw passes to fasten the same, substantially in the same manner as described in a patent already granted to me. The center of the tree is raised, as shown, and near the front edge is a square hole surrounded on the under side with a square recess, $e$, and on the upper side with a polygonal-shaped recess, $f$, both of said recesses, however, extending clear to and through the front edge of the tree. Along the center of the tree at the rear edge it is grooved out from the upper side—or in other words, reduced in thickness, and in this thinner portion the ends of the back-strap loop C are inserted, and firmly soldered or otherwise secured. D represents the check-rein hook, the lower end of which is flattened and shaped to correspond with the recess $f$ on the upper side of the tree. Through this part is also a square hole corresponding in size with the hole through the saddle-tree. From the under side into these holes is passed a square nut, $h$, provided with a plate, $k$, which fits into the recess $e$ on the under side of the saddle-tree, and also with a screw, $i$, which passes up through a hole in the saddle G, the nut $h$, plate $k$, and screw $i$ being made solid, as it were in one piece. An ornamental nut, $m$, is then screwed on to the upper end of the screw $i$ on top of the saddle for securing said parts together. In addition hereto a screw, $n$, is passed from the under side up through the tree and saddle, thus firmly uniting the parts together. The space between the rear edge of the tree and the saddle is to be filled with a suitably-shaped piece of wood.

Having thus fully described my invention, what I claim as new, and desire to secure by Letters Patent, is—

1. The saddle-tree A, constructed as described, with the rear edge made thinner in the center, and at the front edge provided with a square hole surrounded by recesses $e\,f$, substantially as herein set forth.

2. The combination of the tree A, hook D, saddle G, nut $h$, plate $k$, screw $i$, nut $m$, and screw $n$, all constructed and arranged substantially as and for the purposes herein set forth.

In testimony that I claim the foregoing as my own I affix my signature in presence of two witnesses.

PHILIP H. WIEDERSUM.

Witnesses:
JNO. A. ELLIS,
J. V. WHITE.